United States Patent
Bando et al.

(10) Patent No.: US 10,152,061 B2
(45) Date of Patent: *Dec. 11, 2018

(54) DRIVE ASSIST APPARATUS

(71) Applicant: DENSO CORPORATION, Kariya, Aichi-pref. (JP)

(72) Inventors: Takashi Bando, Kariya (JP); Masataka Mori, Kariya (JP); Kazuhito Takenaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,986

(22) Filed: Oct. 4, 2016

(65) Prior Publication Data

US 2017/0102708 A1    Apr. 13, 2017

(30) Foreign Application Priority Data

Oct. 8, 2015   (JP) .................................. 2015-200142

(51) Int. Cl.
    *G05D 1/02*    (2006.01)
    *G05D 1/00*    (2006.01)
    (Continued)

(52) U.S. Cl.
    CPC ........... *G05D 1/0221* (2013.01); *B60W 40/00* (2013.01); *G05D 1/0088* (2013.01); *G06N 7/005* (2013.01); *G06N 99/005* (2013.01)

(58) Field of Classification Search
    None
    See application file for complete search history.

(56) References Cited

U.S. PATENT DOCUMENTS

| | | | |
|---|---|---|---|
| 2009/0234552 A1* | 9/2009 | Takeda | B60W 30/16 |
| | | | 701/96 |
| 2012/0154175 A1 | 6/2012 | Bandou et al. | |

(Continued)

FOREIGN PATENT DOCUMENTS

| | | |
|---|---|---|
| JP | 4934058 | 5/2012 |
| JP | 2012-254694 | 12/2012 |

OTHER PUBLICATIONS

Robert Oshana & Mark Kraeling, Software Engineering for Embedded Systems: Methods, Practical Techniques, and Applications (2013) (Year: 2013).*

(Continued)

*Primary Examiner* — Tamara L Weber
(74) *Attorney, Agent, or Firm* — Knobbe, Martens, Olson & Bear, LLP

(57) ABSTRACT

A drive assist apparatus includes a data collection part that collects driving behavior data representing driving maneuvers and vehicle behaviors caused by the driving maneuvers for each drivers, a classification part that classifies the driving behavior data into a plurality of clusters each showing a tendency of driving behavior of the drivers by clustering the driving behavior data, a storage part that stores cluster information representing a driving behavior characteristic of each of the clusters, a subject data acquisition part that acquires, as subject data, the driving behavior data for a subject driver to be assisted, an estimation part that estimates, as a corresponding cluster, one of the clusters to which the subject driver is assumed to belong by comparing the subject data with the cluster information stored in the storage part, and an assist providing part that provides a drive assist depending on the estimated corresponding cluster.

6 Claims, 3 Drawing Sheets

(51) Int. Cl.
G06N 7/00 (2006.01)
G06N 99/00 (2010.01)
B60W 40/00 (2006.01)

(56) References Cited

U.S. PATENT DOCUMENTS

| | | | | |
|---|---|---|---|---|
| 2013/0302756 | A1* | 11/2013 | Takeuchi | F02D 41/1401 434/64 |
| 2014/0028848 | A1* | 1/2014 | Takenaka | H04N 7/18 348/148 |
| 2014/0114974 | A1* | 4/2014 | Ohama | G06F 17/30598 707/737 |
| 2015/0160019 | A1* | 6/2015 | Biswal | G01C 21/26 701/1 |
| 2015/0266455 | A1* | 9/2015 | Wilson | G09B 19/10 701/93 |
| 2016/0187880 | A1* | 6/2016 | Chen | G05D 1/0214 701/27 |

OTHER PUBLICATIONS

Tadahiro Taniguchi and Shogo Nagasaka, Double Articulation Analyzer for Unsegmented Human Motion using Pitman-Yor Language Model and Infinite Hidden Markov Model, IEEE/SICE International Symposium on System Integration (2011) (Year: 2011 ).*
Kemp et al., Learning Systems of Concepts with an Infinite Relational Model, American Association for Artificial Intelligence (2006) (Year: 2006).*
G. Weller et al. "Accident patterns and prospects for maintaining the safety of older drivers", 2014.
T. Taniguchi et al., "Semiotic Prediction of Driving Behavior using Unsupervised Double Articulation Analyzer," IEEE IV, 2012.
C. Kemp et al., "Learning Systems of Concepts with an Infinite Relational Model," AAAI, 2006.
K. Takenaka et al., "Contextual Scene Segmentation of Driving Behavior based on Double Articulation Analyzer" IEEE/RSJ International Conference on Intelligent Robots and Systems, 2012.
T. Bando et al., "Symbolization approach for large-scale driving corpus", IEICE Technical Report vol. 114, No. 306, pp. 337-343, Nov. 2014 w/ translation.
K. Ozawa et al., "Modeling of Individual Characteristics in Driving Behavior Signals Using Spectral Analysis", IEICE Transactions on Information and Systems (Japanese Edition), vol. J90-D, No. 4, pp. 1115-1123, Apr. 2007 w/ translation.

* cited by examiner

DRIVE ASSIST APPARATUS

This application claims priority to Japanese Patent Application No. 2015-200142 filed on Oct. 8, 2015, the entire contents of which are hereby incorporated by reference.

BACKGROUND OF THE INVENTION

1. Field of the Invention

The present invention relates to a technique for implementing an individual driver-oriented drive assist.

2. Description of Related Art

There are known various methods for modeling driving behaviors using simple indexes such as a standard deviation of braking distance or deceleration, or dispersion of steering operation. For example, Japanese Patent Application Laid-open No. 2012-254694 describes a technique in which decline with age in driving maneuvers of a driver are detected by comparing modeled deceleration behavior data as learned data with current deceleration behavior data detected during current driving operation of the driver.

However, since there are quite a variety of driving scenes as drive-assist objects, it is difficult to model them in an integrated way. Therefore, drive-assist objects are limited to simple drive scenes such as a deceleration scene for stopping, a right or left turn scene and a steady travel scene.

In addition, to build a driving behavior model for an individual driver, since a large amount of data of the individual driver has to be collected, it takes long time before the driving behavior model is built up.

SUMMARY

An exemplary embodiment provides a drive assist apparatus including:

a data collection part that collects driving behavior data representing at least one of driving maneuvers and vehicle behaviors caused by the driving maneuvers for each of a plurality of drivers;

a classification part that classifies the driving behavior data into a plurality of clusters each showing a tendency of driving behavior of the drivers by clustering the driving behavior data;

a storage part that stores cluster information representing a driving behavior characteristic of each of the clusters;

a subject data acquisition part that acquires, as subject data, the driving behavior data for a subject driver to be assisted, an estimation part that estimates, as a corresponding cluster, one of the clusters to which the subject driver is assumed to belong by comparing the subject data with the cluster information stored in the storage part; and an assist providing part that performs vehicle control or control of a vehicle-mounted device to assist the subject driver depending on the estimated corresponding cluster.

According to the exemplary embodiment, there is provided a drive assist apparatus capable of providing an appropriate assist to a driver even when an amount of data stored regarding this driver is insufficient.

Other advantages and features of the invention will become apparent from the following description including the drawings and claims.

PREFERRED EMBODIMENTS OF THE INVENTION

First Embodiment

Figure 1:
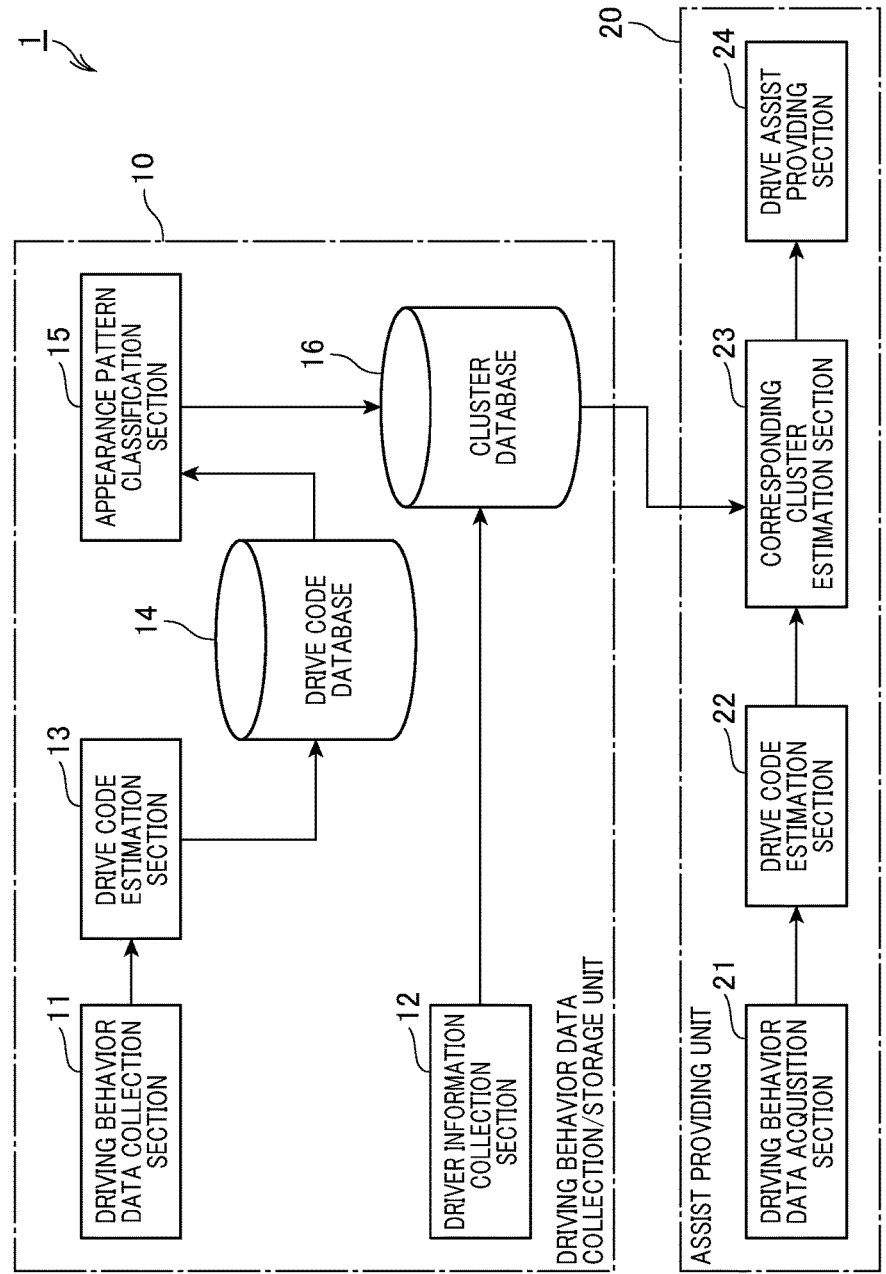
FIG. 1 is a block diagram showing the structure of a drive assist apparatus according to an embodiment of the invention.

FIG. 1 is a block diagram showing the structure of a drive assist apparatus 1 according to an embodiment of the invention. The drive assist apparatus 1 includes a driving behavior data collection/storage unit 10 and an assist providing unit 20. The assist providing unit 20 is mounted on each of vehicles to be assisted. The driving behavior data collection/storage unit 10 is a server connected to a communication network for communication with these vehicles. The driving behavior data collection/storage unit 10 can communicate with each of the vehicles provided with the assist providing unit 20 through this communication network.

Each of the driving behavior data collection/storage unit 10 and the assist providing unit 20 is formed of one or more microcomputers. The functions of each of them are implemented by a program stored in a memory as a non-transitory physical storage medium that are executed by a CPU included in the microcomputer. That is, by executing the program, various processes are performed. FIG. 1 shows functional blocks implemented by the program stored in the memory, which correspond to the functions implemented by the CPU or information used by the CPU. However, the functions of the driving behavior data collection/storage unit 10 and the assist support unit 20 do not necessary have to be implemented by software. Part or all of them may be implemented by hardware including combinations of logic circuits and analog circuits.

The driving behavior data collection/storage unit 10 includes a driving behavior data collection section 11, a driver information collection section 12, a drive code estimation section 13, a drive code database 14, an appearance pattern classification section 15 and a cluster database 16. The driving behavior data collection section 11, the drive code estimation section 13 and the drive code database 14 constitute a data collection part. The appearance pattern classification section 15 constitutes a classification part, the drive code database 14 and the cluster database 16 constitute a storage part.

The driving behavior data collection section 11 collects data showing driving maneuvers performed by drivers, and data showing vehicle behaviors due to the driving maneuvers. The driving behavior data collection section 11 further collects position information and time information showing positions and times at which these data are collected. Such information is collected in large amounts through communication with an unspecified large number of vehicles having the communication function.

The data showing driving maneuvers performed by drivers include an operation amount of an accelerator pedal, an operation amount of a brake pedal, an operation amount of a steering wheel, an operation state of direction indicators, a shift position of a transmission and so on. The data showing vehicle behaviors include a speed, acceleration, a yaw rate of a vehicle and so on. The driving behavior data may include derivatives of such data. Such driving behavior data are represented as continuous time-series data for each trip from engine start to engine stop.

Figure 2:
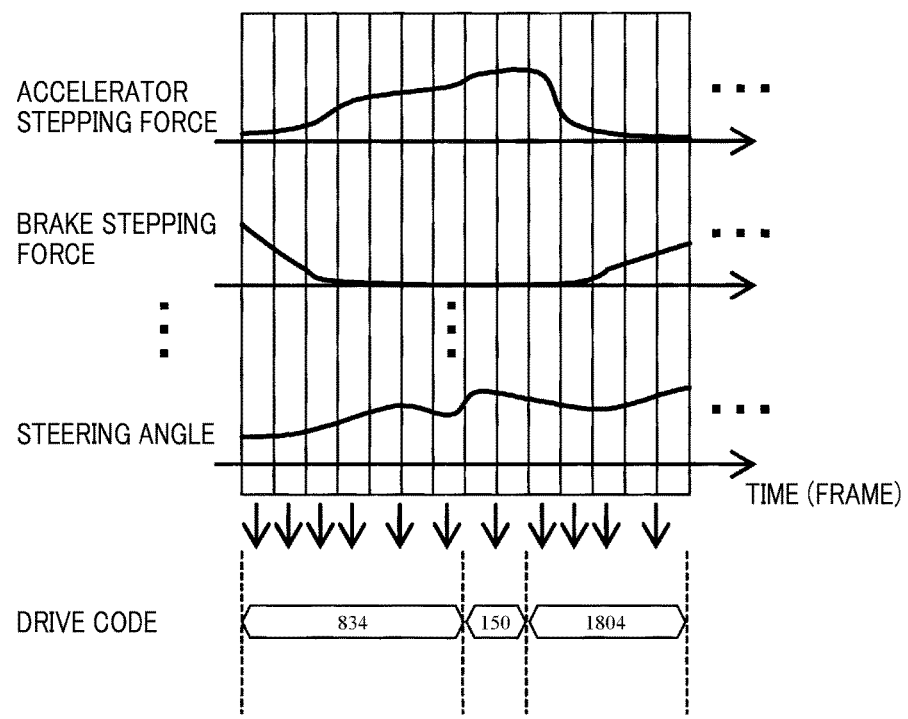
FIG. 2 is a diagram explaining a relationship between driving behavior data and drive codes.

The driver information collection section 12 collects age, sex, driving experience and so on of each driver together with the driving behavior data collected by the driving behavior data collection section 11. As shown in FIG. 2, the drive code estimation section 13 segmentalizes the driving behavior data into a plurality of partial series, and add a drive code to each of the partial series in accordance with the states of the partial series. As a result, the partial series are converted into drive code strings.

The coding method used in this embodiment is such that part or all of the driving behavior data are vectorized, and the resultant vectors are given the drive codes as identification codes. Each of the vectors may be such that represents on by 1 and "off" by 0 showing presence or absence of each driving maneuver. Instead of presence or absence of each driving maneuver, a degree of operation of each driving maneuver normalized in the range from 0 to 1 may be used. Since such vectorization method is well known (refer to Japanese Patent No. 278419, for example), detailed explanation is omitted here.

The drive code estimation section 14 adds up, for each individual driver, the driving behavior data collected in the driving behavior collection section 11, frequency distributions of various feature quantities extracted from the driving behavior data and the drive code strings estimated in the drive code estimation section 13 based on the driver information collected in the driver information collection section 12. The drive code estimation section 14 accumulates resultant frequency distributions of the drive codes and so on while associating them with the driver information. In the following, such information described above are collectively referred to as cluster information.

Figure 3:
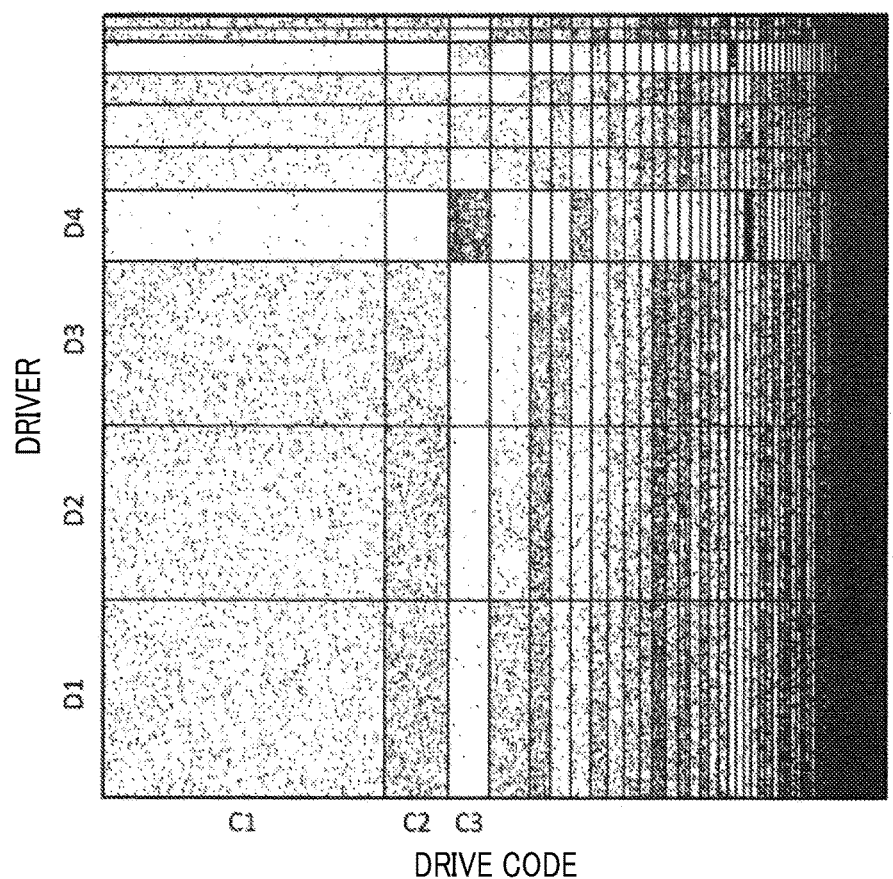
FIG. 3 is a diagram showing a result of clustering in a visualized form.

The appearance pattern classification section 15 performs clustering for vehicle drivers and the drive codes. FIG. 3 is a diagram showing a result of the clustering in a visualized form using an infinite relational model. In FIG. 3, the vertical axis $D_k$ represents the clusters of drivers (referred to as the driver clusters hereinafter), and the horizontal axis $C_m$ represents the clusters of the drive codes (referred to as the code clusters hereinafter). Here, K is the number of the driver clusters, M is the number of the code clusters, k is a positive integer smaller than or equal to K, and m is a positive integer smaller than or equal to M. The point string along the horizontal axis represents patterns of the drive codes which appear while one individual vehicle driver drives a vehicle. Each point represents a presence of one of the drive codes of interest, and each blank represents no presence of one of the drive codes of interest. In the infinite relational model, the driver clusters and the code clusters are defined such that drivers belonging to the same drive cluster $D_k$ are similar to one other in the tendency that the drive codes belonging to the same drive code $C_m$ appear. For example, in FIG. 3, a driver belonging to the drive cluster $D_4$ has a strong tendency that the drive codes belonging to the drive cluster $C_3$ appear, and a weak tendency that the drive codes belonging to the code clusters $C_1$ and $C_2$ appear. That is, for the drivers belonging to the same driver cluster $D_k$, similar patterns of the drive codes appear during driving. In other words, the drivers belonging to the same driver cluster $D_k$ are similar in driving behavior. For detail of such infinite relational model, refer to Japanese Patent No. 4934058, for example.

The cluster database 16 stores results of the clustering performed in the appearance pattern classification section 15 while associating them with the driver information collected in the driver information collection section 12. Specifically, as driving behavior of a driver belonging to the driver cluster $D_k$, a probability p(m|k) that the drive code s belonging to the drive code $C_m$ appears is stored in the cluster database 16. Further, the cluster database 16 stores the driver information and a standard model of the driving behavior data of each of individual drivers belonging to the driver cluster $D_k$ while associating them with the driver clusters $D_1$ to $D_K$. In this embodiment, for each driver cluster $D_k$, an average of the driving behavior data or an average of a feature quantity extracted from the driving behavior data of drivers belonging to the driver cluster $D_k$ is used as the standard model. For example, a histogram of various values of vehicle deceleration as shown in FIG. 3 may be used as the feature quantity extracted from the driving behavior data.

The assist providing unit 20 includes a driving behavior data acquisition section 21, a drive code estimation section 22, a corresponding cluster estimation section 23 and a drive assist providing section 24. The driving behavior data acquisition section 21 and the drive code estimation section 22 constitute a subject data acquisition part. The corresponding cluster estimation section 23 constitutes an estimation part. The drive assist providing section 24 constitutes an assist providing part.

The driving behavior data acquisition section 21 repeatedly acquires at least part of the driving behavior data which the driving behavior data collection section 11 collects from various sensors and a GPS receiver mounted on a vehicle. The data acquired by this driving behavior data acquisition section 21 is used as subject data representing measured values of the driving behavior data of a subject driver (a driver to be assisted).

The drive code estimation section 22 converts the subject data acquired by the driving behavior data acquisition section 21 into drive code strings. The corresponding cluster estimation section 23 estimates a drive cluster to which the subject driver d belongs based on the drive codes estimated by the drive code estimation section 22. The corresponding cluster estimation section 23 adds up the drive codes estimated by the drive code estimation section 2, to generate a set $S_x$ of the drive codes that have appeared in the driving behavior of the subject driver. Subsequently, the corresponding cluster estimation section 23 calculates the probability $p(k|S_x)$ that the subject driver belongs to the driver cluster $D_k$ in accordance with equation (1) described below for each of all the driver clusters $D_1$ to $D_K$. The corresponding cluster estimation section 23 estimates the driver cluster $D_k$ that has the largest value of the probability $p(k|S_x)$ to be the corresponding cluster to which the subject driver belongs. Here, the prior probability p(k) that the subject driver belongs to the driver cluster $D_k$ is assumed to be uniform. Z is a normalization constant. However, to estimate the driver cluster $D_k$, only the value of the probability $p(k|S_x)$ and k have to be compared, it is not necessary to calculate Z actually.

$$p(k|Sx) = \frac{\prod_{s \in Sx} p(m|k, s \in C_m) \cdot p(k)}{Z} \quad (1)$$

-continued
where $$Z = \sum_{k'=1}^{K} \prod_{s \in Sx} p(m \mid k', s \in C_m) \cdot p(k')$$

The drive assist providing section 24 provides a drive assist in accordance with the corresponding cluster estimated by the corresponding cluster estimation section 23. Here, the drive assist means performing various vehicle control or control for various vehicle-mounted devices to assist a driver.

In this embodiment, a standard model is prepared for each driver cluster. If the standard model of the corresponding cluster to which a subject driver belongs greatly deviates from the standard models of other clusters, particularly, if this deviation shows deficiency in driving ability of the driver belonging to the corresponding cluster, vehicle control or warning notification is performed to make up for the deficiency.

Figure 4:
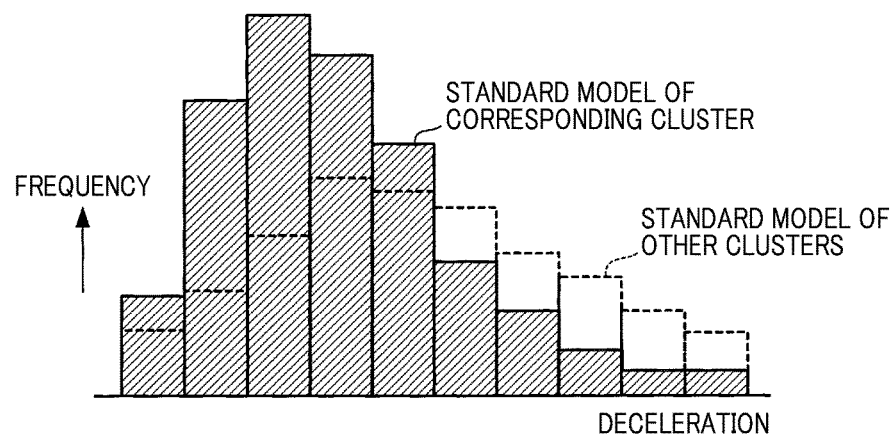
FIG. 4 is a diagram showing an example of feature quantities extracted from the driving behavior data.

Specifically, as shown in FIG. 4, in a case where the standard model of the corresponding cluster to which the subject driver belongs deviates to the low side in deceleration compared to the standard models of other clusters, it can be determined that the subject driver is not able to step on a brake pedal strongly compared to an average vehicle driver. In this case, the drive assist may perform vehicle control such that a brake pressure depending on a depression amount of the brake pedal is increased. Further, timing to issue a warning notifying that a preceding vehicle has decelerated rapidly may be advanced.

The drive assist may indicate lowering of cognitive ability, judgement ability, or exercise capacity. For example, it is possible that an average age of drivers belonging to the corresponding cluster is calculated based on the driver information associated to the driving behavior data belonging to the corresponding cluster using the cluster database 16, and this calculated average age is displayed on a display device or sounded by a speaker device as "driving behavior age". In this case, the subject driver can determine whether his or her cognitive ability, judgement ability, or exercise capacity is deficient by comparing the calculated average age with his or her own age.

The embodiment of the invention described above provides the following advantages.

(1) According to the drive assist apparatus 1, driver clusters each of which drivers who are similar in driving behavior belong to are created by clustering the driving behavior data of a large number of drivers, a corresponding cluster to which a subject driver to be assisted belongs to is estimated, and a drive assist depending on the estimated corresponding cluster is provided. Therefore, it is possible to estimate a drive behavior of the subject driver based on the driving behavior data of the corresponding cluster, even when an accumulation amount of the driving behavior data regarding this subject driver is small. Accordingly, even when the subject driver is in an inexperienced drive scene, it is possible to provide an appropriate drive assist to this subject driver.

(2) According to the drive assist apparatus 1, it is possible to detect deficiency in driving ability of a subject driver by comparing the standard model of the corresponding cluster to which the subject driver belongs with the standard models of other clusters. Accordingly, since the content such as an amount of an assist or timing to assist the subject driver can be changed in accordance with results of the detection, it is possible to provide a drive assist appropriate to the subject driver at an appropriate timing.

Other Embodiments

It is a matter of course that various modifications can be made to the above described embodiment as described below.

(1) In the above described embodiment, the drive code estimation section 13 uses a vectorization technique for coding the driving behavior data. However, any other appropriate technique may be used for coding the driving behavior data. For example, there may be used a technique in which the driving behavior data is segmentalized into a plurality of partial series each representing some drive scene, and each of the partial series is given an identification code by using a DAA (Double Articulation Analyzer). For detail of the DAA, refer to T. Taniguchi et al, "Semiotic Prediction of Driving Behavior using Unsupervised Double Articulation Analyzer" IEEE Intelligent Vehicles Symposium, 2012, or K. Takenaka et al, "Contextual Scene Segmentation of Driving Behavior based on Double Articulation Analyzer" IEEE/RSJ International Conference on Intelligent Robots and Systems, 2012, for example.

(2) In the above described embodiment, the appearance pattern classification section 15 uses a technique based on an infinite relational model for clustering. However, other clustering techniques such as k-means clustering may be used.

(3) The above described embodiment uses the probability p(m|k) which is a probability that the drive codes belonging to the code cluster $C_m$ are included in the driving behavior of drivers belonging to the driver cluster $D_k$. However, it is possible to use m as an identifier (that is, s) of a drive code itself, and use a probability that the drive code s appears in the drive behavior of a driver belonging to the driver cluster $D_k$. In this case, the corresponding cluster estimation section 23 directly uses the probability p(s k) that the drive code s is included in the driving behavior of a driver belonging to the driver cluster $D_k$.

(4) The drive assist apparatus 1 of the present invention and a system including this drive assist apparatus 1 may be practiced using computer programs and a non-transitory physical storage medium storing the computer programs.

(5) The above explained preferred embodiments are exemplary of the invention of the present application which is described solely by the claims appended below. It should be understood that modifications of the preferred embodiments may be made as would occur to one of skill in the art.

What is claimed is:
1. A drive assist apparatus comprising:
at least one sensor configured to sense driving behavior by a subject driver of a vehicle and output driving behavior data representing at least one of driving maneuvers and vehicle behaviors caused by the driving maneuvers of the subject driver;
a vehicle-mounted drive assist device configured to perform vehicle control to assist the subject driver;
at least one processor;
a non-transitory computer-readable storage medium; and
a set of computer-executable instructions stored on the non-transitory computer-readable storage medium that cause the at least one processor to:
collect driving behavior data representing at least one of driving maneuvers and vehicle behaviors caused by the driving maneuvers for each of a plurality of drivers;

classify the driving behavior data into a plurality of clusters each showing a tendency of driving behavior of the drivers by clustering the driving behavior data based on a drive code series;

store cluster information representing a driving behavior characteristic of each of the clusters;

acquire, as subject data, the driving behavior data for a subject driver to be assisted, estimate, as a corresponding cluster, one of the clusters to which the subject driver is assumed to belong by comparing the subject data with the cluster information stored;

collect driver information including at least ages of the drivers, while associating the driver information with the driving behavior data collected, and using the driver information in performing the clustering;

calculate an average age of the drivers belonging to the corresponding cluster based on the driver information associated to the driving behavior data belonging to the corresponding cluster stored; and control the vehicle-mounted drive assist device to perform vehicle control to assist the subject driver depending on the estimated corresponding cluster.

2. The drive assist apparatus according to claim 1, wherein the at least one processor segmentalizes data representing states of driving behaviors of the drivers into a plurality of partial series, and adds a drive code to each of the partial series in accordance with states of the partial series to thereby generate drive code series as the driving behavior data, and appearance patterns of the drive codes generated for each of the drivers are used as feature quantities in the classification and the estimation.

3. The drive assist apparatus according to claim 2, wherein the at least one processor uses a double articulation analyzer to generate the drive code series.

4. The drive assist apparatus according to claim 1, wherein the at least one processor uses an infinite relational model to perform the clustering.

5. The drive assist apparatus according to claim 1, wherein the at least one processor provides to a display the calculated average age as a driving behavior age of the subject driver.

6. The drive assist apparatus according to claim 1, wherein the at least one processor calculates a difference in average driving behavior between the drivers belonging to the corresponding cluster and the drivers belonging to other clusters based on the driving behavior data belonging to the corresponding clusters stored, and provides a drive assist to make up for the difference.

* * * * *